United States Patent
Lee et al.

(10) Patent No.: US 10,212,674 B2
(45) Date of Patent: *Feb. 19, 2019

(54) POWER HEADROOM REPORTING SCHEME FOR MULTIPLE SUBFRAME CONFIGURATIONS

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/909,700

(22) PCT Filed: Aug. 5, 2014

(86) PCT No.: PCT/KR2014/007214
§ 371 (c)(1),
(2) Date: Feb. 2, 2016

(87) PCT Pub. No.: WO2015/041406
PCT Pub. Date: Mar. 26, 2015

(65) Prior Publication Data
US 2016/0174173 A1 Jun. 16, 2016

Related U.S. Application Data

(60) Provisional application No. 61/880,799, filed on Sep. 20, 2013.

(51) Int. Cl.
*H04W 52/36* (2009.01)
*H04B 7/26* (2006.01)
(Continued)

(52) U.S. Cl.
CPC ........ *H04W 52/365* (2013.01); *H04B 7/2615* (2013.01); *H04J 3/00* (2013.01);
(Continued)

(58) Field of Classification Search
CPC . H04B 7/2615; H04J 3/00; H04L 5/14; H04L 5/1469; H04W 52/365; H04W 72/0406; H04W 72/042; H04W 72/0446
See application file for complete search history.

(56) References Cited

U.S. PATENT DOCUMENTS

2012/0039223 A1  2/2012  Chang
2012/0082046 A1  4/2012  Ho et al.
(Continued)

FOREIGN PATENT DOCUMENTS

EP   2437554      4/2012
JP   2012080540   4/2012
(Continued)

OTHER PUBLICATIONS

"Technical Specification Group Radio Access Network, Evolved Universal Terrestrial Radio Access (E-UTRA); Medium Access Control (MAC) protocol specification (Release 10)", 3GPP TS 36.321, V10.7.0 (Dec. 2012).*
(Continued)

*Primary Examiner* — Asad M Nawaz
*Assistant Examiner* — Zhaohui Yang
(74) *Attorney, Agent, or Firm* — Lee, Hong, Degerman, Kang & Waimey

(57) ABSTRACT

The present invention relates to a wireless communication system. More specifically, the present invention relates to power headroom reporting (PHR) in terms of multiple TDD UL/DL subframe configurations. According to one aspect of the present invention, the UE receives information informing the UE of multiple time division duplex (TDD) uplink/

(Continued)

| $C_7$ | $C_6$ | $C_5$ | $C_4$ | $C_3$ | $C_2$ | $C_1$ | R |
|---|---|---|---|---|---|---|---|
| P | V | PH (Type 2, PCell) | | | | | |
| R | R | $P_{CMAX,c}1$ | | | | | |
| P | V | PH (Type 1, PCell) | | | | | |
| R | R | $P_{CMAX,c}2$ | | | | | |
| P | V | PH (Type 1, SCell 1) | | | | | |
| R | R | $P_{CMAX,c}3$ | | | | | |
| ... | | | | | | | |
| P | V | PH (Type 1, SCell n) | | | | | |
| R | R | $P_{CMAX,c}m$ | | | | | | downlink (UL/DL) subframe configurations, and transmits a power headroom reporting (PHR) to the network. Here, the PHR comprises an identifier informing the network that the PHR is for a specific TDD UL/DL subframe configuration with regards to the multiple TDD UL/DL subframe configurations.

15 Claims, 13 Drawing Sheets

(51) Int. Cl.
*H04J 3/00* (2006.01)
*H04W 72/04* (2009.01)
*H04L 5/14* (2006.01)

(52) U.S. Cl.
CPC .............. *H04L 5/14* (2013.01); *H04L 5/1469* (2013.01); *H04W 72/042* (2013.01); *H04W 72/0406* (2013.01); *H04W 72/0446* (2013.01)

(56) References Cited

U.S. PATENT DOCUMENTS

| | | | |
|---|---|---|---|
| 2012/0294167 A1 | 11/2012 | Zhu et al. | |
| 2013/0070716 A1 | 3/2013 | Kwon et al. | |
| 2013/0279377 A1* | 10/2013 | Zhao | H04L 5/001 370/280 |
| 2014/0018124 A1 | 1/2014 | Ahn et al. | |
| 2014/0376460 A1 | 12/2014 | Hooli et al. | |
| 2015/0003345 A1 | 1/2015 | Kuo | |
| 2015/0036645 A1 | 2/2015 | Shin et al. | |
| 2015/0163815 A1 | 6/2015 | Lei et al. | |
| 2015/0195795 A1 | 7/2015 | Loehr et al. | |
| 2015/0230286 A1 | 8/2015 | Feuersaenger et al. | |
| 2015/0358998 A1* | 12/2015 | Golitschek | H04W 48/16 370/280 |
| 2016/0029239 A1* | 1/2016 | Sadeghi | H04W 52/244 370/252 |
| 2016/0029289 A1 | 1/2016 | Wang et al. | |
| 2016/0044610 A1 | 2/2016 | Hwang et al. | |
| 2016/0150487 A1 | 5/2016 | Aiba et al. | |
| 2016/0198420 A1 | 7/2016 | Lee et al. | |
| 2016/0205635 A1 | 7/2016 | Kwon et al. | |
| 2017/0070960 A1 | 5/2017 | Haim et al. | |
| 2017/0223641 A1 | 8/2017 | Haim et al. | |

FOREIGN PATENT DOCUMENTS

| | | |
|---|---|---|
| JP | 2013524584 | 6/2013 |
| JP | 2013534080 | 8/2013 |
| KR | 1020120016987 | 2/2012 |
| WO | 2012083811 | 6/2012 |
| WO | 2012162877 | 12/2012 |
| WO | 2013002562 | 1/2013 |
| WO | 2014110764 | 7/2014 |

OTHER PUBLICATIONS

MediaTek Inc., "Power Headroom Reporting in TDD eIMTA," 3GPP TSG-RAN WG1 Meeting #74, R1-133538, Aug. 2013, 4 pages.
LG Electronics, "Uplink Power Control for Dynamic TDD UL-DL Reconfigurations," 3GPP TSG RAN WG1 Meeting #74, R1-133363, Aug. 2013, 4 pages.
PCT International Application No. PCT/KR2014/007214, Written Opinion of the International Searching Authority dated Nov. 17, 2014, 9 pages.
PCT International Application No. PCT/KR2014/007218, Written Opinion of the International Searching Authority dated Nov. 24, 2014, 10 pages.
PCT International Application No. PCT/KR2014/007215, Written Opinion of the International Searching Authority dated Nov. 19, 2014, 10 pages.
United States Patent and Trademark Office U.S. Appl. No. 14/910,873, Office Action dated Sep. 18, 2017, 13 pages.
United States Patent and Trademark Office U.S. Appl. No. 14/910,614, Office Action dated Jul. 20, 2017, 14 pages.
United States Patent and Trademark Office U.S. Appl. No. 61/836,898, filed Jun. 19, 2013, 18 pages.
United States Patent and Trademark Office U.S. Appl. No. 14/910,614, Final Office Action dated Feb. 8, 2018.
United States Patent and Trademark Office U.S. Appl. No. 14/910,614, Office Action dated Jun. 21, 2018, 14 pages.

\* cited by examiner (a) Control-Plane Protocol Stack (b) User-Plane Protocol Stack

```
              #0  #1  #2  #3  #4  #5  #6  #7  #8  #9
       Cell 1  D   S   U   U   U   D   S   U   U   U
(TDD configuration 0)

Cell 2  D   S   U   D   D   D   S   U   D   D
(TDD configuration 0)
```

SF set - pattern 1        SF set - pattern 2

POWER HEADROOM REPORTING SCHEME FOR MULTIPLE SUBFRAME CONFIGURATIONS

CROSS-REFERENCE TO RELATED APPLICATIONS

This application is the National Stage filing under 35 U.S.C. 371 of International Application No. PCT/KR2014/007214, filed on Aug. 5, 2014, which claims the benefit of U.S. Provisional Application No. 61/880,799, filed on Sep. 20, 2013, the contents of which are all hereby incorporated by reference herein in their entirety.

TECHNICAL FIELD

The present invention relates to a wireless communication system and, more particularly, to power headroom reporting (PHR) scheme in a wireless network employing TDD scheme.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a prior art. The technical problems solved by the present invention are not limited to the above technical problems and those skilled in the art may understand other technical problems from the following description.

Technical Solution

To achieve the above object, in one aspect of the present invention, a method of communicating with a network by a user equipment (UE) is provided. This method comprises: receiving information informing the UE of multiple time division duplex (TDD) uplink/downlink (UL/DL) subframe configurations; and transmitting a power headroom reporting (PHR) to the network, wherein the PHR comprises an identifier informing the network that the PHR is for a specific TDD UL/DL subframe configuration with regards to the multiple TDD UL/DL subframe configurations.

In another aspect of the present invention, a user equipment (UE) communicating with a network is provided. This UE comprises: a transceiver configured to transmit and receive signals; and a processor connected to the transceiver and configured to control the transceiver to receive information informing the UE of multiple time division duplex (TDD) uplink/downlink (UL/DL) subframe configurations, to include an identifier informing the network that a power headroom reporting (PHR) is for a specific TDD UL/DL subframe configuration with regards to the multiple TDD UL/DL subframe configurations, when the PHR is transmitted to the network.

Here, the identifier with a first value may inform the network that the PHR is for a TDD UL/DL subframe configuration according to system information, the identifier with a second value may inform the network that the PHR is for uplink subframes among all subframes according to one or more predefined TDD UL/DL subframe configurations, and the identifier with a third value may inform the network that the PHR is for a specific one of the multiple TDD UL/DL subframe configurations.

Here, the predefined TDD UL/DL subframe configuration may comprise an union of UL subframes from one or more of a default TDD UL/DL subframe configuration based on system information and the multiple TDD UL/DL subframe configurations. And, the predefined TDD UL/DL subframe configuration may comprise one or more intersections of UL subframes from one or more of a default TDD UL/DL subframe configuration based on system information and the multiple TDD UL/DL subframe configurations.

The predefined TDD UL/DL subframe configuration can be a TDD UL/DL subframe configuration configured by the network by a RRC signaling, and a TDD UL/DL subframe configuration deduced by the UE considering a default TDD UL/DL subframe configuration based on system information and the multiple TDD UL/DL subframe configurations.

The UE may further receive, from the network, information on each value of the identifier for an indication of the PHR for each of the specific TDD UL/DL subframe configurations. The information on the identifier may further comprise whether the PHR needs more than one identifier.

The UE may further receive, from the network, information on which of the multiple TDD UL/DL subframe configurations the PHR is to be reported.

The UE may transmit the PHR for multiple cells the UE is connected, and the PHR may comprise power headroom information for each of the multiple cells with identifiers for indicating a specific TDD UL/DL subframe configuration in the corresponding cell.

Each of the multiple TDD UL/DL subframe configuration may allocate more downlink subframes than default TDD UL/DL subframe configuration based on system information.

It is to be understood that both the foregoing general description and the following detailed description of the present invention are exemplary and explanatory and are intended to provide further explanation of the invention as claimed.

Advantageous Effects

According to the present invention, the communication can be performed by using adaptable TDD UL/DL subframe structure. Further, the network can more accurately estimate power headroom information according to various TDD UL/DL subframe configuration.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
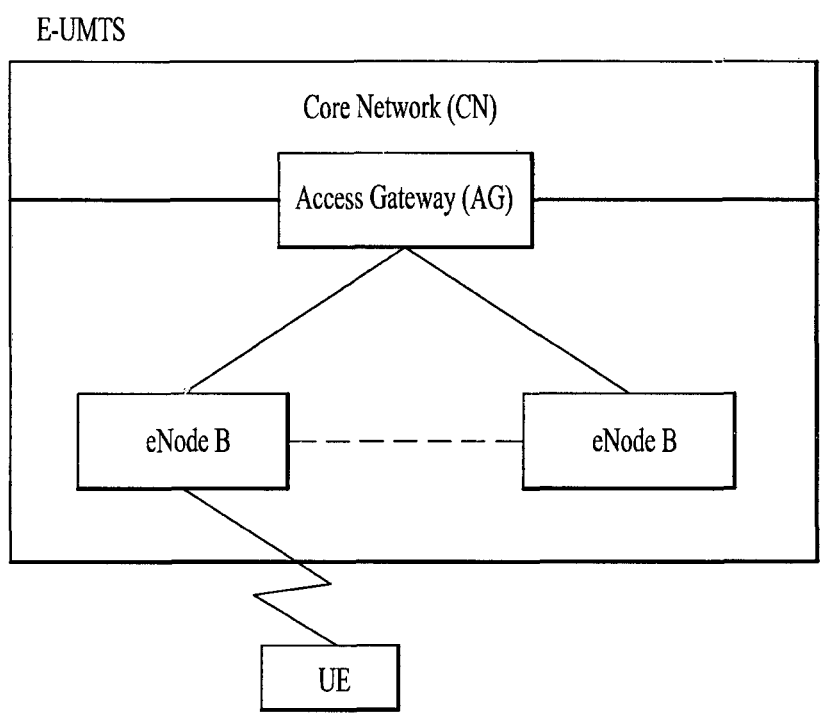
FIG. 1 is a diagram showing a network structure of an Evolved Universal Mobile Telecommunications System (E-UMTS) as an example of a wireless communication system.
Figure 2A:
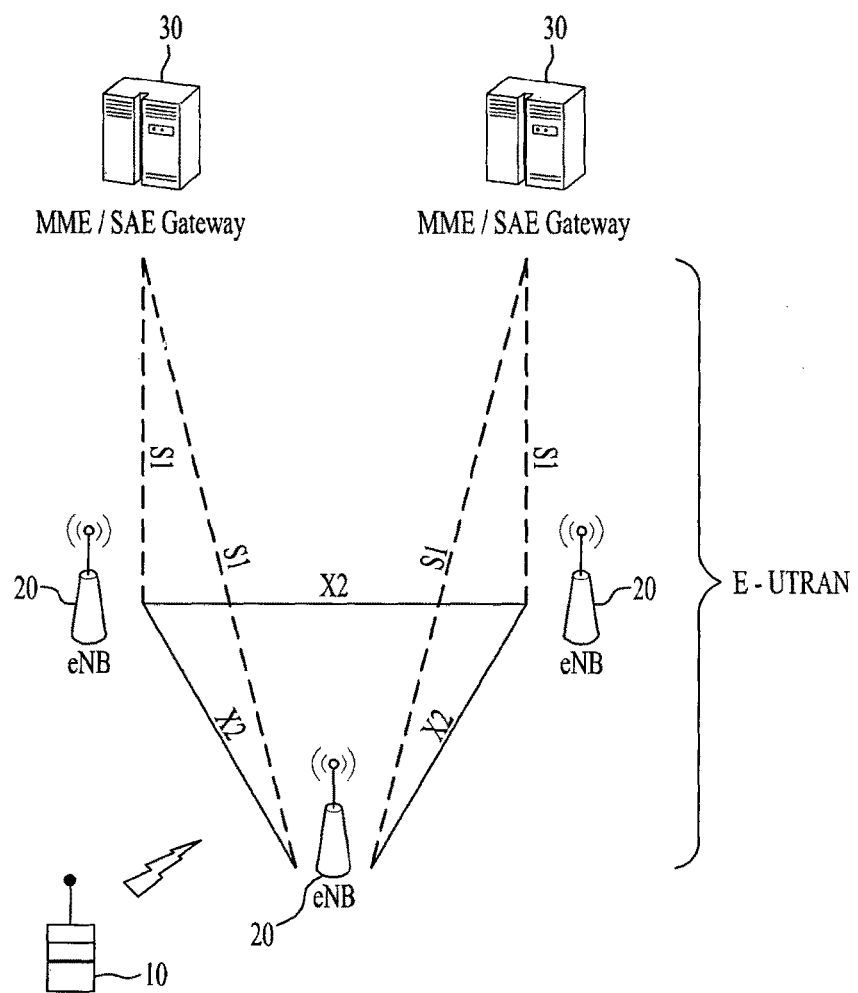
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
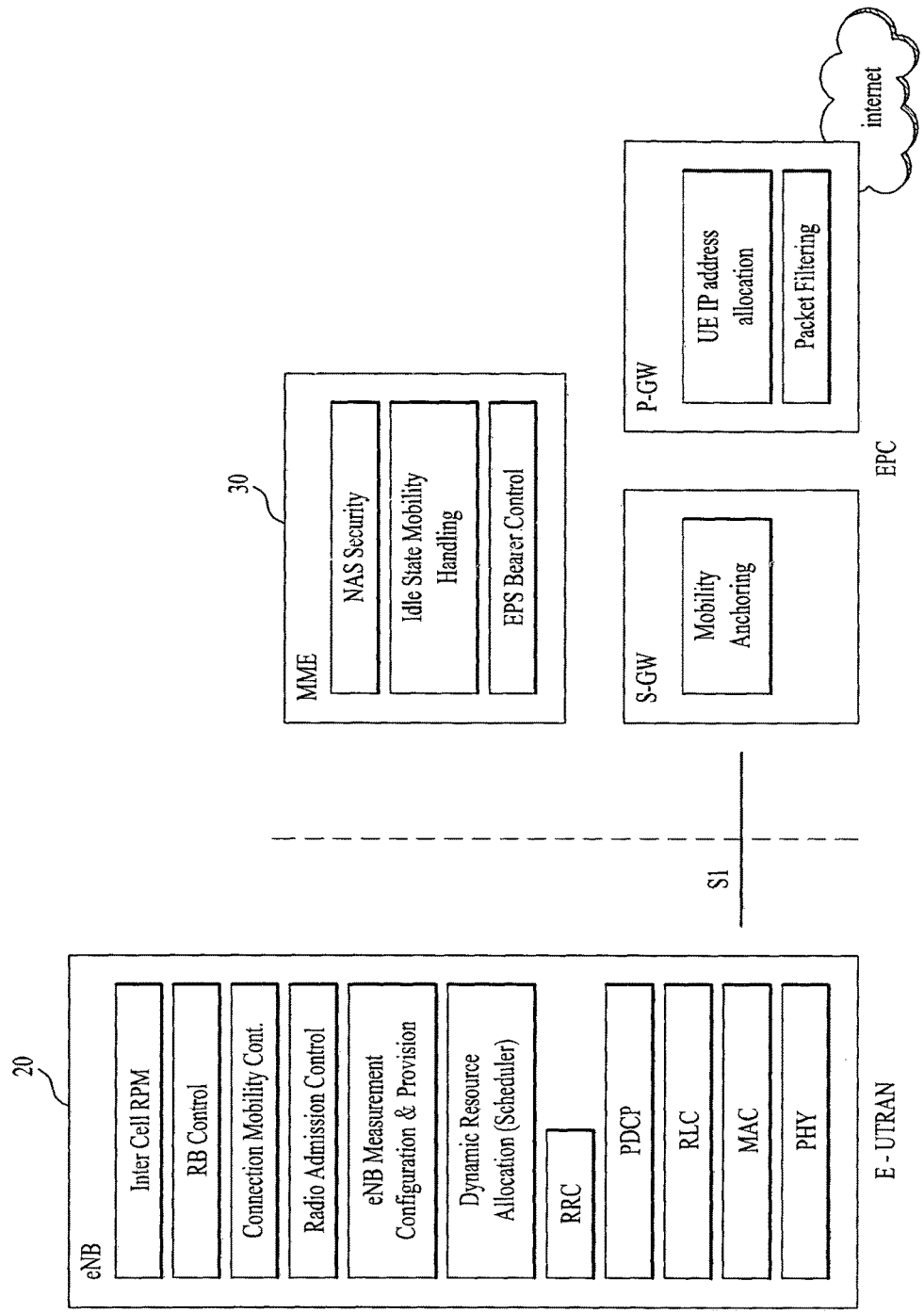
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2B, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
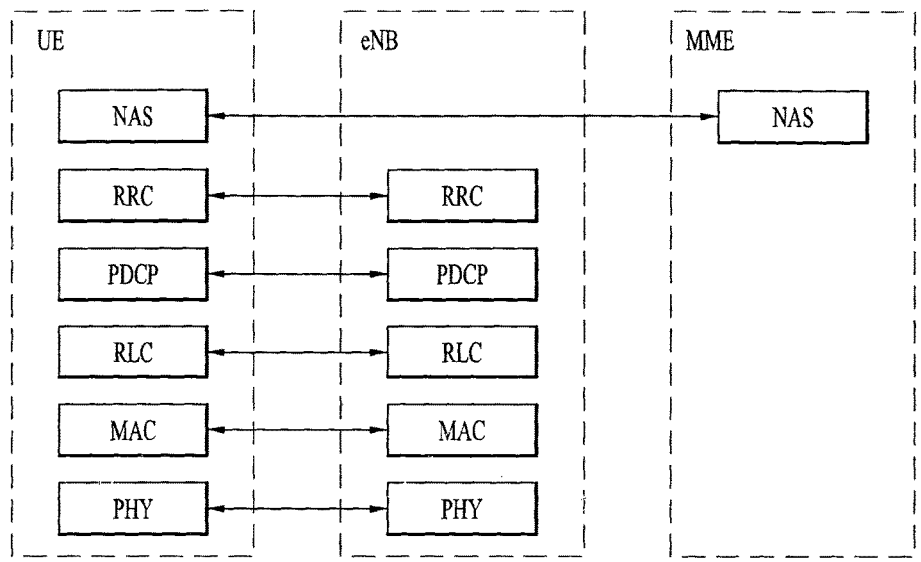
FIG. 3 is a diagram showing a control plane and a user plane of a radio interface protocol between a UE and an E-UTRAN based on a 3rd generation partnership project (3GPP) radio access network standard.
Figure 3:
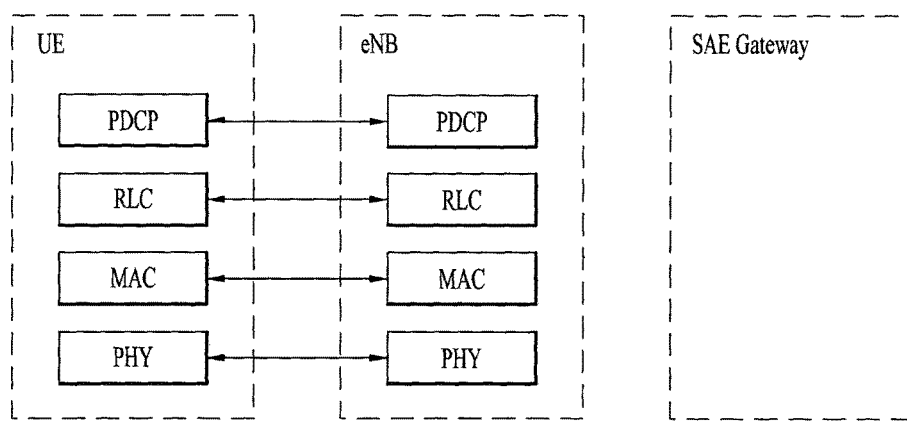

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
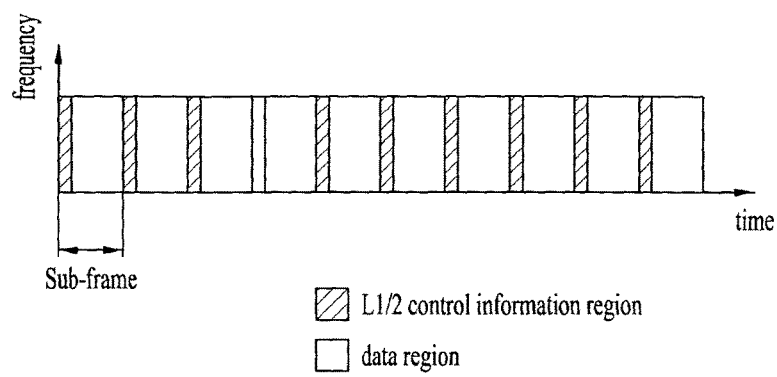
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

In the communication system where the present invention is to be applied, there may be 2 frame structures both for FDD and TDD schemes.

Figure 5:
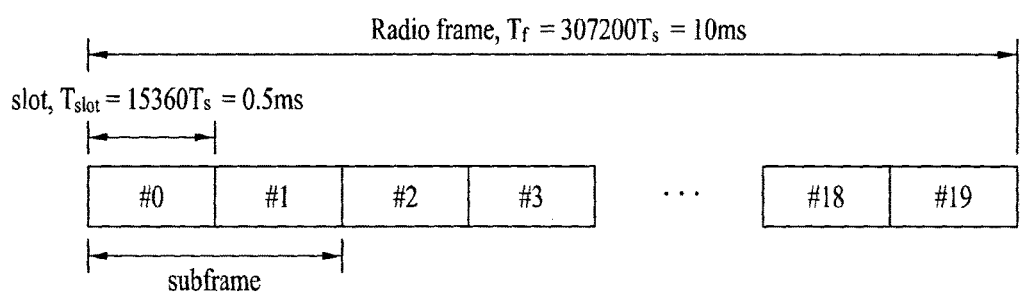
FIG. 5 is a diagram showing the structure of a radio frame used in a Long Term Evolution (LTE) system.

FIG. 5 is a diagram showing the structure of a radio frame used in an LTE system using FDD scheme.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

This type of frame structure can be named as frame structure type 1, and it is applicable to both full duplex and half duplex FDD schemes.

Figure 6:
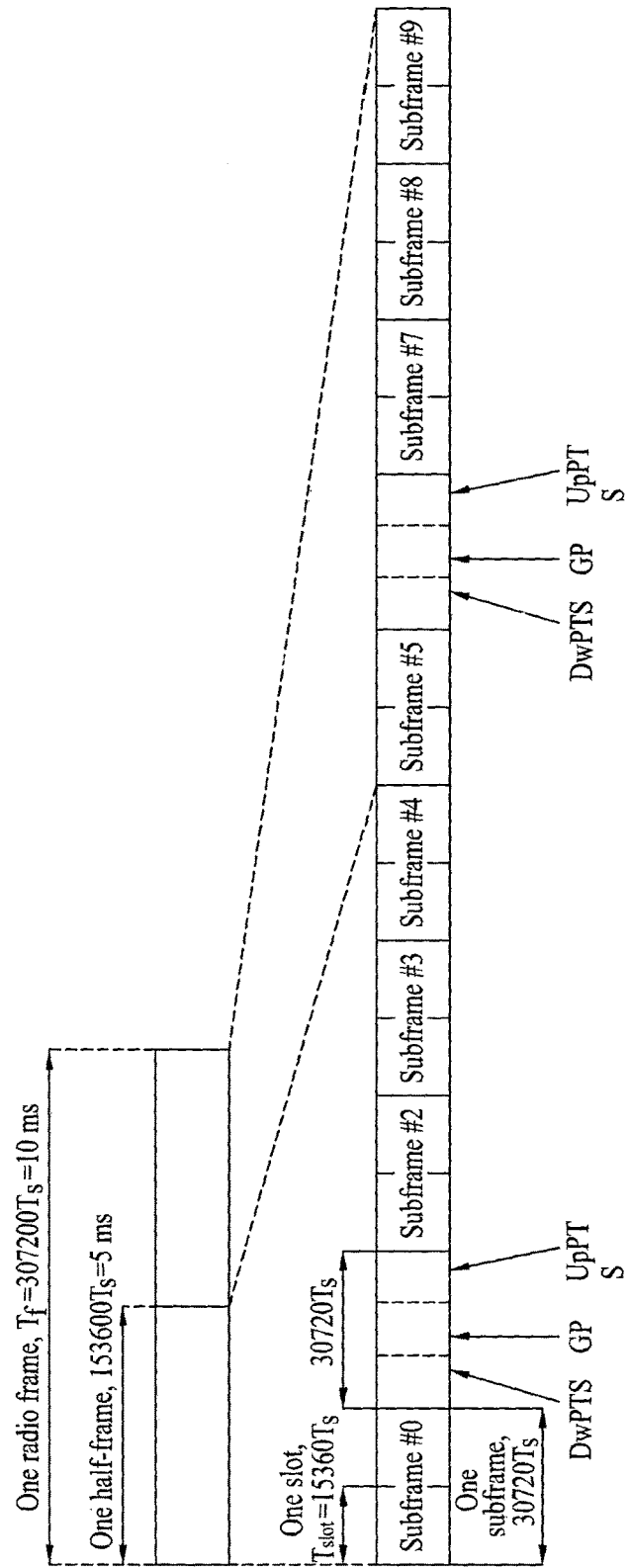
FIG. 6 is a diagram showing the structure of a radio frame used in an LTE system using TDD scheme.

FIG. 6 is a diagram showing the structure of a radio frame used in an LTE system using TDD scheme.

Frame structure shown in FIG. 6 can be referred to as frame structure type 2. Frame structure, type 2 is applicable to TDD. Each radio frame of length $T_f=307200 \cdot T_s=10$ ms consists of two half-frames of length $153600 \cdot T_s=5$ ms each. Each half-frame consists of five subframes of length $30720 \cdot T_s=1$ ms.

The supported uplink-downlink configurations are listed in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes the subframe is reserved for downlink transmissions, "U" denotes the subframe is reserved for uplink transmissions and "S" denotes a special subframe with the three fields DwPTS, GP and UpPTS.

The length of DwPTS and UpPTS is given by Table 2 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 2-continued

| | | Normal cyclic prefix in downlink | | | Extended cyclic prefix in downlink | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Uplink-downlink configurations with both 5 ms and 10 ms downlink-to-uplink switch-point periodicity are supported.

In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are preferably reserved for downlink transmission. UpPTS and the subframe immediately following the special subframe are always reserved for uplink transmission.

The above explained TDD UL/DL configuration is signaled via system information. Specifically, the TDD configuration information can be signaled via System Information Block Type 1 message which is transmitted from the network to the UE.

However, there is a need for changing the TDD UL/TD subframe configuration based on the amount of traffic to/from the UE in each direction. And, the adaptable of the TDD UL/DL subframe configuration based on the needs of specific UE(s) is difficult to be realized by using the system information. So, one aspect of the present invention proposes to use a scheme where TDD UL/DL subframe configuration can be easily changed. This scheme can be referred to as eIMTA (enhanced Interference Management and Traffic Adaptation).

Figure 7:
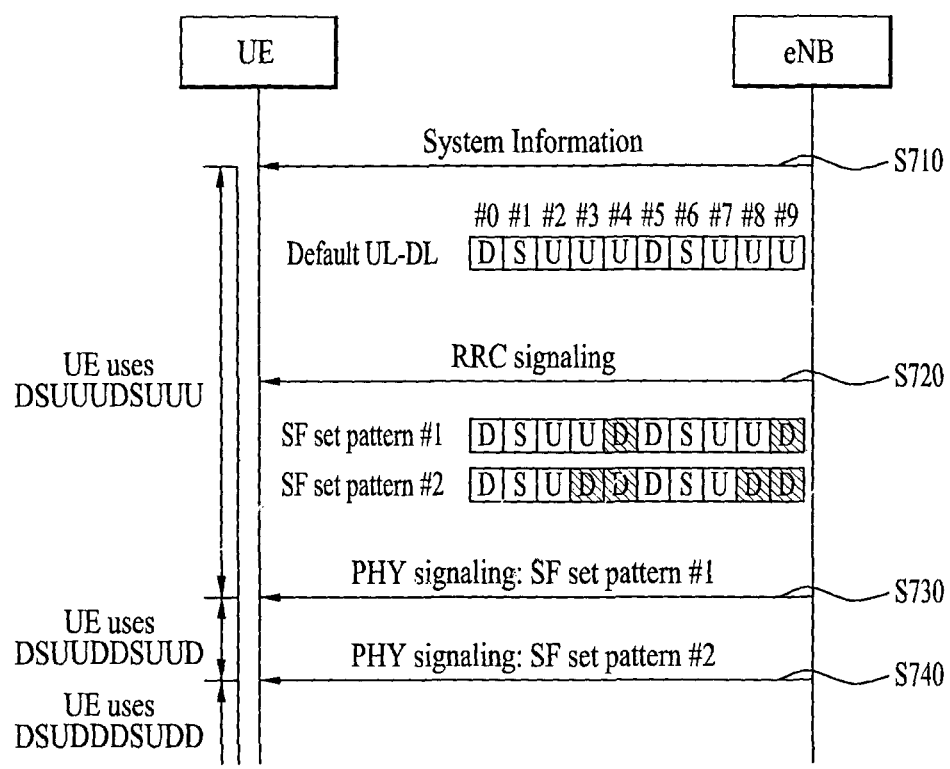
FIG. 7 shows an exemplary process for eIMTA scheme according to one example of the present invention.

FIG. 7 shows an exemplary process for eIMTA scheme according to one example of the present invention.

As explained above, by using eIMTA scheme in TDD system, the UL-DL configuration can be changed based on the amount of traffic in each direction.

First, the default UL-DL configuration for TDD system may be provided in System Information (S710). This configuration is cell-specific, and does not change unless the cell is reconfigured. Thus, it is called default UL-DL configuration. The default UL-DL configuration is the configuration explained above as signaled via System Information Block Type 1.

In this example, the subframes #0 and #5 are downlink subframes based on the default configuration, the subframes #1 and #6 are special subframes (DwPTS) which can also be used for downlink transmission, and the subframes #2, #3, #4, #7, #8, and #9 are uplink subframes. This pattern is applied to each radio frame.

With eIMTA according to one example of the present invention configured, if the eNB wants to increase downlink transmission to a UE, the eNB may provides SF (Subframe) set pattern information to the UE by the dedicated RRC signaling (e.g. RRC Connection Reconfiguration message) (S720). The eNB can provide multiple SF set patterns to the UE. In this example, the SF set pattern #1 changes subframes #4 and #9 to DL subframes, and the SF set pattern #2 changes #3, #4, #8, and #9 to DL subframes, compared to the default UL-DL configuration. The eNB may also provide the start time and duration of each SF set pattern.

After providing the SF set pattern information, the eNB can dynamically change the UL-DL configuration of the UE depending on the actual amount of data. The dynamic change can be realized by PHY signaling such as PDCCH signaling.

In this example, the eNB may transmit L1 signaling to use SF set pattern #1 (S730) instead of default UL/DL configuration. On another instance, the eNB may transmit L1 signaling to command the UE to use SF pattern #2 (S740) by considering the amount of traffic to be transmitted.

TDD offers flexible deployments without requiring a pair of spectrum resources. LTE TDD allows for asymmetric UL-DL allocations by providing seven different semi-statically configured uplink-downlink configurations. These allocations can provide between 40% and 90% DL subframes. The semi-static allocation may or may not match the instantaneous traffic situation. Evaluations reveals significant performance benefits by allowing TDD UL-DL reconfiguration based on traffic adaptation in small cells.

Also, in order to avoid interference caused by this TDD UL-DL reconfiguration, one aspect of the present invention proposes to use adequate interference avoidance scheme with this TDD UL-DL reconfiguration. The interference avoidance schemes to be used can be one or more of (a) cell clustering interference mitigation, (b) scheduling dependent interference mitigation, (c) interference mitigation based on eICIC/FeICIC schemes, and (d) interference suppressing interference mitigation.

By using eIMTA scheme, the network can acquires performance benefits. But, the applicant of the present invention considered that there can be insufficient information on power headroom for each of TDD UL/DL subframe configuration. That is, by using eIMTA, the interference level is different across the UL/DL subframe configuration. Thus, the power headroom for one UL/DL subframe configuration may not valid for other UL/DL subframe configuration. Hereinafter, the power headroom reporting (PHR) in terms of TDD UL/DL configuration will be explained.

The Power Headroom reporting procedure is used to provide the serving eNB with information about the difference between the nominal UE maximum transmit power and the estimated power for UL-SCH transmission per activated Serving Cell and also with information about the difference between the nominal UE maximum power and the estimated power for UL-SCH and PUCCH transmission on PCell.

The reporting period, delay and mapping of Power Headroom are predefined in a communication system. RRC controls Power Headroom reporting by configuring the two timers periodicPHR-Timer and prohibitPHR-Timer, and by signaling dl-PathlossChange which sets the change in measured downlink pathloss and the required power backoff due to power management (as allowed by P-MPR$_c$) to trigger a PHR.

A Power Headroom Report (PHR) shall be triggered if any of the following events occur:

(1) prohibitPHR-Timer expires or has expired and the path loss has changed more than dl-PathlossChange dB for at least one activated Serving Cell which is used as a pathloss reference since the last transmission of a PHR when the UE has UL resources for new transmission;

(2) periodicPHR-Timer expires;

(3) upon configuration or reconfiguration of the power headroom reporting functionality by upper layers, which is not used to disable the function;

(4) activation of an SCell with configured uplink.

(5) prohibitPHR-Timer expires or has expired, when the UE has UL resources for new transmission, and the following is true in this TTI for any of the activated Serving Cells with configured uplink:

(6) there are UL resources allocated for transmission or there is a PUCCH transmission on this cell, and the required power backoff due to power management (as allowed by P-MPR$_c$) for this cell has changed more than dl-PathlossChange dB since the last transmission of a PHR when the UE had UL resources allocated for transmission or PUCCH transmission on this cell.

It is preferred for the UE to avoid triggering a PHR when the required power backoff due to power management decreases only temporarily (e.g. for up to a few tens of milliseconds) and it is preferable to avoid reflecting such temporary decrease in the values of $P_{CMAX,c}$/PH when a PHR is triggered by other triggering conditions.

Figure 8:
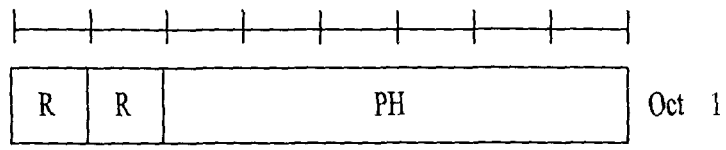
FIG. 8 is a diagram illustrating an example of power headroom MAC control element.

FIG. 8 is a diagram illustrating an example of power headroom MAC control element.

The Power Headroom MAC control element is identified by a MAC PDU subheader with LCID as specified in table 3.

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

It has a fixed size and consists of a single octet defined as follows.

In FIG. 8, 'R' represents reserved bit, set to "0", and 'Power Headroom (PH)' field indicates the power headroom level. The length of the field is 6 bits. The reported PH and the corresponding power headroom levels are shown in above Table 4.

TABLE 4

| PH | Power Headroom Level |
| --- | --- |
| 0 | POWER_HEADROOM_0 |
| 1 | POWER_HEADROOM_1 |

TABLE 4-continued

| PH | Power Headroom Level |
| --- | --- |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Figure 9:
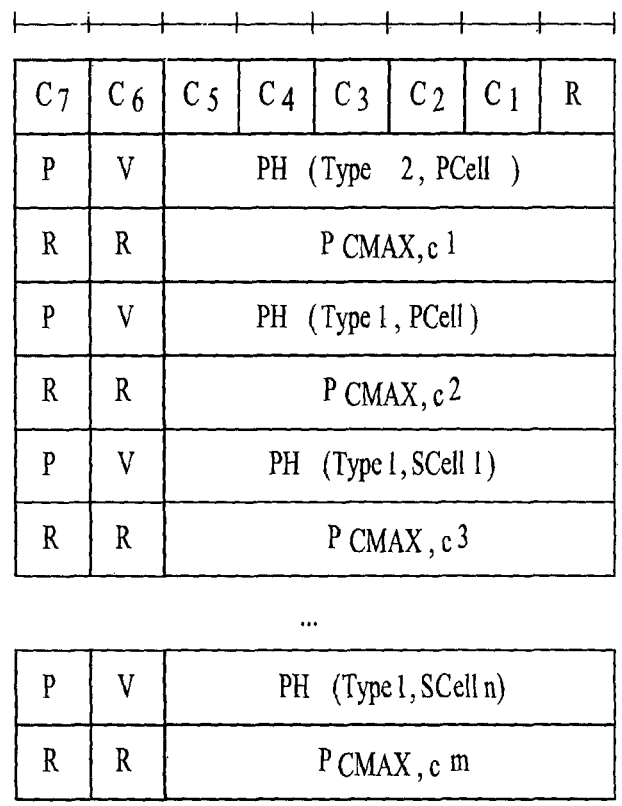
FIG. 9 is a diagram illustrating an example of extended power headroom MAC control element.

FIG. 9 is a diagram illustrating an example of extended power headroom MAC control element.

The Extended Power Headroom MAC control element is identified by a MAC PDU subheader with LCID as specified in the above table 3.

It has a variable size and is defined in FIG. 9. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the ServCellIndex an octet with the Type 1 PH field and an octet with the associated $P_{CMAX,c}$ field (if reported), for the PCell and for each SCell indicated in the bitmap.

The Extended Power Headroom MAC Control Element is defined as follows:

$C_i$: this field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding, power headroom levels are shown in Table 5;

TABLE 5

| $P_{CMAX,c}$ | Nominal UE transmit power level |
| --- | --- |
| 0 | PCMAX_C_00 |
| 1 | PCMAX_C_01 |
| 2 | PCMAX-C_02 |
| ... | ... |
| 61 | PCMAX_C_61 |
| 62 | PCMAX_C_62 |
| 63 | PCMAX_C_63 |

P: this field indicates whether the UE applies power backoff due to power management (as allowed by P-MPR$_c$). The UE shall set P=1 if the corresponding $P_{CMAX,c}$ field would have had a different value if no power backoff due to power management had been applied;

$\tilde{P}_{CMAX,c}$: if present, this field indicates the $P_{CMAX,c}$ or $\tilde{P}_{CMAX,c}$ used for calculation of the preceding PH field.

The power headroom reporting range is from −23 ... +40 dB. Table 6 defines the report mapping.

TABLE 6

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

For the uplink transmission, the UE uses the Power Headroom Reporting (PHR) in order to provide the network with information about the difference between the nominal maximum transmit power and the estimated required transmit power. Thus, PHR indicates how much transmission power can be additionally used from the UE side.

As explained, one aspect of the present invention proposes to use eIMTA scheme. According to this method, given the default TDD UL-DL configuration via system information, the UE can be configured by the network that some subframes indicated by the SF set-pattern are adaptively used as an UL subframe or a DL subframe according to the traffic load.

Figure 10:
FIG. 10 is a diagram for explaining the different interference level according to UL/DL subframe configuration.

In this case, the interference level is different across the SF set-pattern as shown in FIG. 10.

FIG. 10 is a diagram for explaining the different interference level according to UL/DL subframe configuration.

In FIG. 10, the average interference in subframes #0, #1, #5, and #6 is different from that in subframes #3, #4, #8, and #9 because the subframes #3, #4, #8, and #9 are used as UL subframe for Cell 1 while the subframes #0, #1, #5, and #6 are used as DL subframe for Cell 1. Thus, the power headroom over the SF set-pattern 1 is different from the power headroom over the SF set-pattern 2.

Thus, it should be noted that the power headroom of one SF set-pattern can be different from the power headroom of other SF set-patterns.

According to conventional art, the PHR is calculated assuming similar interference level across the subframes. Accordingly, there was no mechanism for the UE to transmit the PHR of a cell to the network according to the SF set-pattern. Thus, it is impossible to provide the network with accurate power headroom information if the interference level is different across the subframes by applying the SF set-pattern.

To address the above explained problem, one aspect of the present invention proposes to define new triggering condition(s) for PHR.

Figure 11:
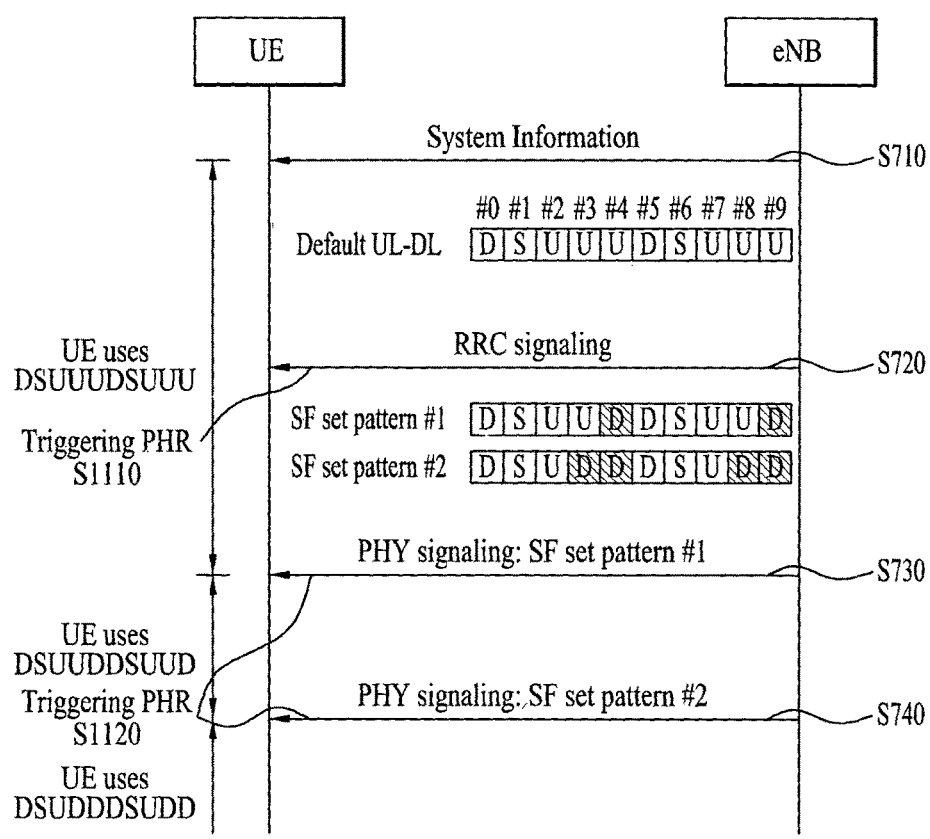
FIG. 11 is a diagram explaining one embodiment of the present invention.

FIG. 11 is a diagram explaining one embodiment of the present invention.

According to one embodiment of the present invention, PHR is triggered when dedicated signaling on TDD UL/DL configuration is received from the network. More specifically, the UE may receive information on a first TDD UL/DL subframe configuration (S710). In FIG. 11, the first TDD UL/DL subframe configuration information is exemplified as system information indicating default TDD UL/DL subframe configuration of DSUUUDSUUU. While using the default TDD UL/DL subframe configuration, the UE may receive information on a second TDD UL/DL subframe configuration informing the UE of a change from the first TDD UL/DL subframe configuration. In FIG. 11, the UE first receives RRC signaling on multiple SF set patterns (e.g. SF set pattern #1 and #2) (S720). Even though the UE receives this RRC signaling, the UE keeps using the default pattern of USUUUDSUUU until receiving physical signaling to use another SF set pattern. Then, the UE may receives L1 signaling to use SF set pattern #1 (S730) or SF set pattern (S740).

According to this embodiment, the UE may trigger power headroom reporting (PHR) when the information on the second TDD UL/DL subframe configuration is received (S1120). Reception of the information on the second TDD UL/DL subframe configuration may correspond to the reception of RRC signaling on the various SF set patterns (S720) and/or the reception of the physical signaling to use another SF set pattern (S730 or S740).

Thus, according to one embodiment, the UE triggers the Power Headroom Reporting (PHR) when any of the following events occurs:

Configuration or Reconfiguration of a SF Set-Pattern

The network configures the UE with at least one SF set-pattern for a cell.

Upon configuration or reconfiguration of at least one SF set-pattern, the UE triggers a PHR.

Indication to use SF Set-Pattern

The network configures the UE with at least one SF set-pattern for a cell.

The network indicates to the UE to use one of the SF set-pattern configured to the UE for a cell.

Upon receiving the indication to use one of the SF set-pattern, the UE triggers a PHR.

The configuration of SF set-pattern may be signaled by RRC signaling. It may be defined by at least one subframe per a radio frame. It may include the identifier of SF set-pattern, start time, duration and a TH_PATTERN for each SF set-pattern.

The indication to use SF set-pattern may be signaled by RRC or MAC or PHY signaling. It may include the identifier of SF set-pattern, start time and duration.

Another embodiment of the present invention proposes to define new triggering condition(s) for PHR as follows.

Figure 12:
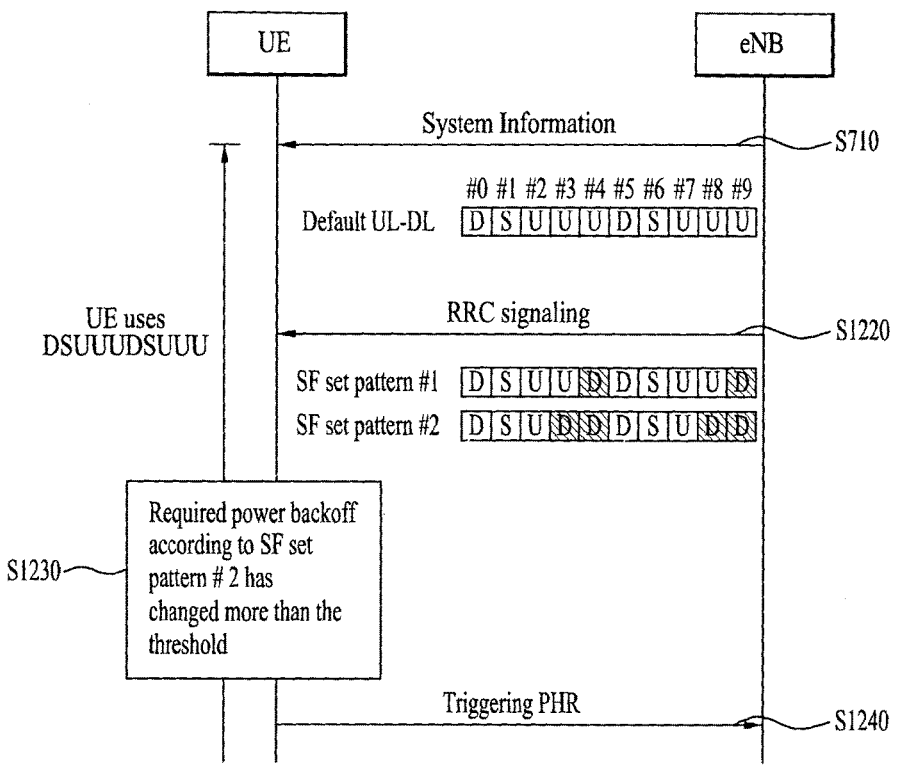
FIG. 12 is a diagram explaining another embodiment of the present invention.

FIG. 12 is a diagram explaining another embodiment of the present invention.

In this embodiment, the UE may trigger the PHR, when a required power backoff according to any of the multiple TDD UL/DL subframe configurations has changed more than a threshold value. In order for implementing this, the eNB may inform the UE of information on a threshold value for PHR. This information may comprise the threshold values for each of the multiple TDD UL/DL subframe configuration. But, in another example, common threshold value can be used for the multiple TDD UL/DL subframe configuration.

In FIG. 12, the UE has default TDD UL/DL subframe configuration based on the received system information (S710). While using this default TDD UL/DL subframe configuration, the UE may receive information informing the UE of multiple TDD UL/DL subframe configurations and information on a threshold value for a power headroom reporting (PHR) (S1220). In this example, the UE receives information on 2 SF set pattern (SF set pattern #1 and SF set pattern #2). A threshold value for PHR can be a common value for SF set patterns #1 and #2, or individual value for two patterns. This threshold value may be dl-Pathloss-Change set for each SF set pattern.

The UE may determines that the required power backoff according to any of SF set pattern #1 or #2 has changed more than the threshold value (S1230). More specifically, there can be a case where there are UL resources allocated for transmission or there is a PUCCH transmission on this cell, and where the required power backoff due to power management (as allowed by P-MPR$_c$) for this cell has changed more than the threshold value of the present embodiment since the last transmission of a PHR when the UE had UL resources allocated for transmission or PUCCH transmission on this cell. In this case, the UE according to the present embodiment may trigger the PHR (S1240).

The term 'required power backoff' due to power management means required amount of power reduction in setting a transmission power to ensure compliance with predetermined factors. For example, the UE is allowed to set its configured maximum output power P$_{CMAX,c}$ for serving cell c. The configured maximum output power P$_{CMAX,c}$ is set within the following bounds defines in Equation 1:

$$P_{CMAX\_L,c} \leq P_{CMAX,c} \leq P_{CMAX\_H,c} \text{ with} \quad \text{[Equation 1]}$$

$$P_{CMAX\_L,c} = \text{MIN}\{P_{EMAX,c} - DT_{C,c}, P_{PowerClass} - \text{MAX}(MPR_c + A\text{-}MPR_c + \Delta T_{IB,c} + DT_{C,c}, P\text{-}MPR_c)\}$$

$$P_{CMAX\_H,c} = \text{MIN}\{P_{EMAX,c}, P_{PowerClass}\}$$

Here, P$_{EMAX,c}$ is the value given by IE P-Max for serving cell c; P$_{PowerClass}$ is the maximum UE power without taking into account the tolerance; MPR$_c$ and A-MPR$_c$ for serving cell c are respectively predefined; DT$_{IB,c}$ is the additional tolerance for serving cell c; DT$_{IB,c}$=0 dB otherwise; DT$_{C,c}$=1.5 dB or DT$_{C,c}$=0 dB.

P-MPR$_c$ is the allowed maximum output power reduction for (a) ensuring compliance with applicable electromagnetic energy absorption requirements and addressing unwanted emissions/self desense requirements in case of simultaneous transmissions on multiple RAT(s) for scenarios not in scope of 3GPP RAN specifications; (b) ensuring compliance with applicable electromagnetic energy absorption requirements in case of proximity detection is used to address such requirements that require a lower maximum output power.

When the information on the threshold value comprises threshold values for each of the multiple TDD UL/DL subframe configurations, the PHR may be triggered, if a required power backoff according to each of the multiple TDD UL/DL subframe configurations has changed more than the threshold value of the corresponding TDD UL/DL subframe configuration.

To sum, according to the present embodiment, the UE triggers PHR, when the required power backoff has changed more than a threshold for a SF set-pattern of a cell. The network may configure the UE with at least one SF set-pattern and threshold value, e.g. TH_PATTERN, for a cell: A TH_PATTERN corresponds to a SF set-pattern. The UE may measure, for each SF set-pattern of each cell, the required power backoff due to power management for the subframes defined by the SF set-pattern. If the required power backoff for any of the SF set-pattern has changed more than its TH_PATTERN since the last transmission of a PHR, the UE triggers a PHR.

In another aspect of the present invention, new format of PHR is introduced for implementing eIMTA. This new format of PHR may be called as SF set pattern specific PHR.

Figure 13:
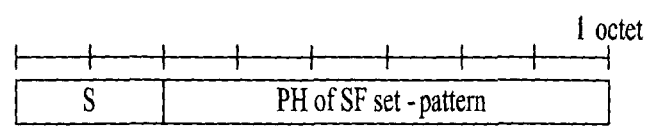
FIG. 13 is a diagram showing a format of PHR according to one embodiment of the present invention.

FIG. 13 is a diagram showing a format of PHR according to one embodiment of the present invention.

In this embodiment, when a PHR is triggered, the UE may send a new type of PHR specific to SF set-pattern instead of a legacy PHR. The SF set-pattern PHR may comprises a SF set-pattern PH, where the SF set-pattern PH is calculated such that the power headroom is calculated only for the UL subframes defined by the SF set-pattern.

The SF set-pattern PHR is realized by a new type of MAC Control Element (CE) called SF set-pattern PH MAC CE. The MAC CE may include an identifier of a SF set-pattern and the PH of the SF set-pattern. An example of SF set-pattern PHR is shown in FIG. 13.

In FIG. 13, 'S field' identifies the SF set-pattern for which the power headroom is included in the SF set-pattern PH MAC CE. The length of the S field may be 2 hits.

'S=00' may indicate the power headroom of UL subframes of the default TDD UL/DL configuration of the cell, i.e. the power headroom is measured without applying any SF set-pattern. The default TDD UL/DL configuration is provided by the system information.

'S=01' may indicate the power headroom of UL subframes of the first SF set-pattern of the cell.

'S=10' may indicate the power headroom of UL subframes of the second SF set-pattern of the cell.

'S=11' may indicate the power headroom of UL subframes of the pre-defined TDD UL/DL configuration. The pre-defined TDD UL/DL configuration can be configured by the network by RRC signaling, or deduced by the UE considering default TDD UL/DL configuration and all SF set-patterns configured for a cell, e.g. union of UL subframes or intersection of UL subframes.

'PH of SF set-pattern' field may specify the power headroom level of a SF set-pattern identified by S field. The length of the PH of set-pattern field may be 6 bits.

When a PHR is triggered, what shall be included in the SF set-pattern PH MAC CE may comprises one or more of the following:

(a) the PH of pre-defined TDD UL/DL configuration (S=11)

(b) the PH of default TDD UL/DL configuration (S=00)

(c) the PH of SF set-pattern that triggers the SF set-pattern PHR (S=01 or S=10). E.g. the required power backoff for the SF set-pattern has changed more than its TH_PATTERN since the last transmission of a PHR (d) the PH of SF set-pattern having; (S=01 or S=10) the maximum number of subframes, the minimum number of subframes, the largest power headroom, the smallest power headroom, the largest amount of path loss change, the smallest amount of path loss change.

When a PHR is triggered for a cell, the UE can send PH for all cells it is connected to. For each cell, the UE can include SF set-pattern PH with above criteria. In order to send PHR for all SF set-patterns, as one embodiment of the present invention, a new type of PHR, called extended SF set-pattern specific PHR, is proposed.

Figure 14:
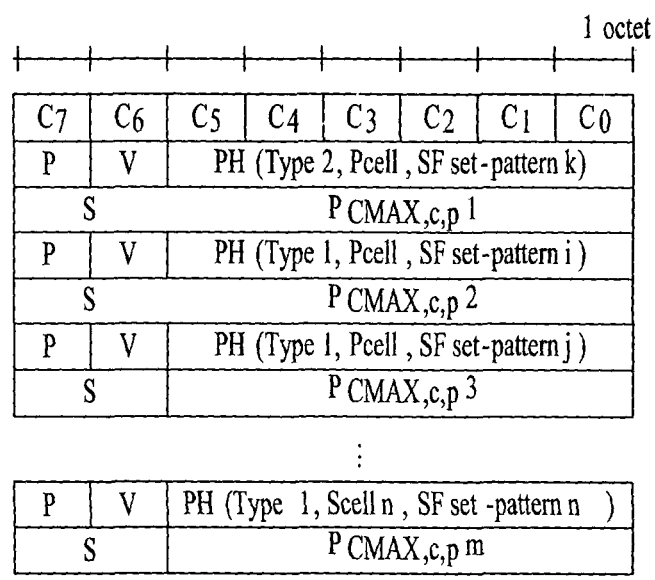
FIG. 14 is a diagram showing an example of extended SF set pattern specific PHR according to one embodiment of the present invention.

FIG. 14 is a diagram showing an example of extended SF set pattern specific PHR according to one embodiment of the present invention.

For each cell, the number of SF set-pattern PH included is equal to the number of SF set-pattern configured, if at least one SF set-pattern is configured. If no SF set-pattern is configured for a cell, only one SF set-pattern PH is included, which is either 'S=00' (default TDD UL/DL configuration) or 'S=11' (pre-defined TDD UL/DL configuration).

For the PCell, both Type 1 and Type 2 PHs are included, and for the SCell, only Type 1 PH is included.

The $P_{CMAX,c,p}$ field indicates the configured UE transmit power of the cell c for SF set-pattern p which is used for calculation of the preceding PH field.

Ci field indicates the presence of a PH field for the SCell with SCellIndex i. The $C_i$ field set to "1" indicates that a PH field for the SCell with SCellIndex i is reported. The $C_i$ field set to "0" indicates that a PH field for the SCell with SCellIndex i is not reported. P field indicates whether the UE applies power backoff due to power management. The UE shall set P=1 if the corresponding $P_{CMAX,c,p}$ field would have had a different value if no power backoff due to power management had been applied.

Figure 15:
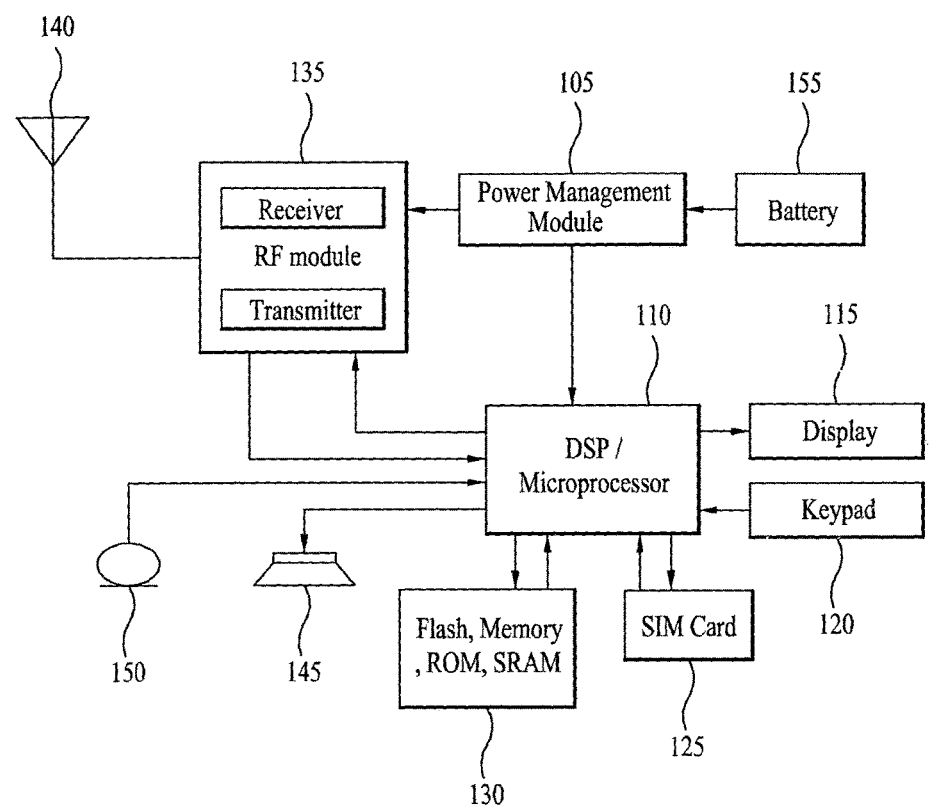
FIG. 15 is a block diagram of a communication apparatus according to an embodiment of the present invention.

V field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c,p}$ field, and V=1 indicates that the octet containing the associated $P_{CMAX,c,p}$ field is omitted;

FIG. 15 is a block diagram of a communication apparatus according to an embodiment of the present invention.

The apparatus shown in FIG. 15 can be a user equipment (UE) and/or eNB adapted to perform the above mechanism, but it can be any apparatus for performing the same operation.

As shown in FIG. 15, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 15 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 15 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method of communicating with a network by a user equipment (UE), the method comprising:
receiving information informing the UE of multiple time division duplex (TDD) uplink/downlink (UL/DL) subframe configurations; and
transmitting a Power Headroom Report (PHR) to the network, wherein the PHR comprises:
an identifier informing the network that the PHR is for a specific TDD UL/DL subframe configuration with regards to the multiple TDD UL/DL subframe configurations; and
a Power Headroom (PH) value of the specific TDD UL/DL subframe configuration,
wherein the identifier is received in a separate field of the PHR from a field conveying the PH value.

2. The method of claim 1, wherein the identifier with a first value informs the network that the PHR is for a TDD UL/DL subframe configuration according to system information.

3. The method of claim 1, wherein the identifier with a second value informs the network that the PHR is for uplink subframes among all subframes according to one or more predefined TDD UL/DL subframe configurations.

4. The method of claim 3, wherein the predefined TDD UL/DL subframe configuration comprises a union of UL subframes from one or more of a default TDD UL/DL subframe configuration based on system information and the multiple TDD UL/DL subframe configurations.

5. The method of claim 3, wherein the predefined TDD UL/DL subframe configuration comprises one or more intersections of UL subframes from one or more of a default TDD UL/DL subframe configuration based on system information and the multiple TDD UL/DL subframe configurations.

6. The method of claim 3, wherein the predefined TDD UL/DL subframe configuration is a TDD UL/DL subframe configuration configured by the network by a Radio Resource Control (RRC) signaling, or a TDD UL/DL subframe configuration deduced by the UE considering a default TDD UL/DL subframe configuration based on system information and the multiple TDD UL/DL subframe configurations.

7. The method of claim 1, wherein the identifier with a third value informs the network that the PHR is for a specific one of the multiple TDD UL/DL subframe configurations.

8. The method of claim 1, wherein the UE further receives, from the network, information on each value of the identifier for an indication of the PHR for each of the specific TDD UL/DL subframe configurations.

9. The method of claim 8, wherein the information on the identifier further comprises whether the PHR needs more than one identifier.

10. The method of claim 1, wherein the UE further receives, from the network, information on which of the multiple TDD UL/DL subframe configurations the PHR is to be reported.

11. The method of claim 1, wherein the UE transmits the PHR for multiple cells the UE is connected, and
wherein the PHR comprises power headroom information for each of the multiple cells with identifiers for indicating a specific TDD UL/DL subframe configuration in the corresponding cell.

12. The method of claim 1, wherein each of the multiple TDD UL/DL subframe configurations allocates more downlink subframes than a default TDD UL/DL subframe configuration based on system information.

13. A user equipment (UE) communicating with a network, the UE comprising:
a transceiver configured to transmit and receive signals; and
a processor connected to the transceiver and configured to control the transceiver to receive information informing the UE of multiple time division duplex (TDD) uplink/downlink (UL/DL) subframe configurations, and to transmit a Power Headroom Report (PHR) to the network,
wherein the PHR comprises:
an identifier informing the network that the PHR is for a specific TDD UL/DL subframe configuration with regards to the multiple TDD UL/DL subframe configurations; and
a Power Headroom (PH) value of the specific TDD UL/DL subframe configuration,
wherein the identifier is received in a separate field of the PHR from a field conveying the PH value.

14. The UE of claim 13, wherein the identifier with a first value informs the network that the PHR is for a TDD UL/DL subframe configuration according to system information.

15. The UE of claim 13, wherein the identifier with a second value informs the network that the PHR is for uplink subframes among all subframes according to one or more predefined TDD UL/DL subframe configurations.

* * * * *